United States Patent
Geyer et al.

(10) Patent No.: US 10,941,566 B2
(45) Date of Patent: Mar. 9, 2021

(54) FIREPROOFING STRIP

(71) Applicant: TREMCO ILLBRUCK PRODUKTION GMBH, Bodenwöhr (DE)

(72) Inventors: Walter Geyer, Schwandorf (DE); Markus Komma, Burglengenfeld (DE); Michael Pronold, Guteneck (DE)

(73) Assignee: TREMCO ILLBRUCK PRODUKTION GMBH, Bodenwohr (DE)

( * ) Notice: Subject to any disclaimer, the term of this patent is extended or adjusted under 35 U.S.C. 154(b) by 119 days.

(21) Appl. No.: 16/097,919

(22) PCT Filed: May 9, 2017

(86) PCT No.: PCT/EP2017/061083
§ 371 (c)(1),
(2) Date: Oct. 31, 2018

(87) PCT Pub. No.: WO2017/194552
PCT Pub. Date: Nov. 16, 2017

(65) Prior Publication Data
US 2019/0145098 A1    May 16, 2019

(30) Foreign Application Priority Data
May 9, 2016 (DE) .................... 10 2016 108 538.3

(51) Int. Cl.
*E04B 1/94* (2006.01)
*A62C 2/06* (2006.01)
(Continued)

(52) U.S. Cl.
CPC .............. *E04B 1/947* (2013.01); *A62C 2/065* (2013.01); *C08J 9/42* (2013.01); *C08L 75/04* (2013.01);
(Continued)

(58) Field of Classification Search
CPC .......... E04B 1/947; E04B 1/942; E04B 1/946; E04B 1/948; C08L 75/04; C08L 2201/02;
(Continued)

(56) References Cited

U.S. PATENT DOCUMENTS

| 4,992,481 A | 2/1991 | Von Bonin et al. |
| 8,889,754 B2 | 11/2014 | Rodrigo et al. |

(Continued)

FOREIGN PATENT DOCUMENTS

| CN | 202643621 | 1/2013 |
| CN | 103589255 | 2/2014 |

(Continued)

OTHER PUBLICATIONS

International Search Report and Written Opinion dated Sep. 11, 2017 issued in corresponding International Application No. PCT/EP2017/061083.

(Continued)

*Primary Examiner* — Andrew J. Oyer
(74) *Attorney, Agent, or Firm* — Onello & Mello, LLP

(57) ABSTRACT

Fireproofing device (1), in particular a fireproofing strip (1), with an elongate support (2), which is produced from a foam material, a non-woven fabric and/or a fibrous body and is provided with an impregnating agent. According to the invention this impregnating agent contains as components at least one liquid medium and a binder for binding solid components of the impregnating agent to the foam material and expandable graphite.

18 Claims, 1 Drawing Sheet

(51) Int. Cl.
    *C09K 21/02*     (2006.01)
    *C09K 21/04*     (2006.01)
    *C08J 9/42*     (2006.01)
    *C08L 75/04*     (2006.01)
    *E06B 5/16*     (2006.01)
    *C09K 3/10*     (2006.01)
    *E06B 1/62*     (2006.01)

(52) U.S. Cl.
    CPC .............. *C09K 21/02* (2013.01); *C09K 21/04* (2013.01); *E04B 1/942* (2013.01); *E04B 1/946* (2013.01); *E04B 1/948* (2013.01); *C08J 2205/06* (2013.01); *C08J 2375/04* (2013.01); *C08J 2433/00* (2013.01); *C08L 2201/02* (2013.01); *C08L 2203/14* (2013.01); *C09K 2003/1037* (2013.01); *C09K 2003/1053* (2013.01); *E06B 5/164* (2013.01); *E06B 2001/626* (2013.01)

(58) Field of Classification Search
    CPC .. C08L 2203/14; A62C 2/065; C08J 2375/04; C08J 9/42; C08J 2205/06; C08J 2433/00; E06B 5/164; E06B 2001/626; C09K 2003/1053; C09K 21/02; C09K 21/04; C09K 2003/1037
See application file for complete search history.

(56) References Cited

U.S. PATENT DOCUMENTS

| | | |
|---|---|---|
| 2004/0226100 A1 | 11/2004 | Small, Jr. et al. |
| 2009/0217841 A1* | 9/2009 | Galembeck .............. C08K 3/32 106/31.13 |
| 2011/0262312 A1* | 10/2011 | Pham-Huu ........... B01J 37/0244 422/186 |
| 2012/0029103 A1 | 2/2012 | Rodrigo et al. |
| 2015/0159023 A1 | 6/2015 | Lipka et al. |

FOREIGN PATENT DOCUMENTS

| | | |
|---|---|---|
| DE | 3808275 | 9/1989 |
| DE | 20303672 | 4/2004 |
| DE | 202012000883 | 5/2013 |
| EP | 0507463 | 10/1992 |
| EP | 0835900 | 4/1998 |
| WO | 2014116815 | 7/2014 |

OTHER PUBLICATIONS

German Search Report dated Jul. 6, 2016 issued in corresponding German Application No. 102016108538.3.
International Preliminary Report on Patentability dated Nov. 22, 2018 issued in corresponding International Application No. PCT/EP2017/061083.
European Office Action dated Mar. 25, 2020 issued in corresponding European Application No. 17729019.4.

* cited by examiner

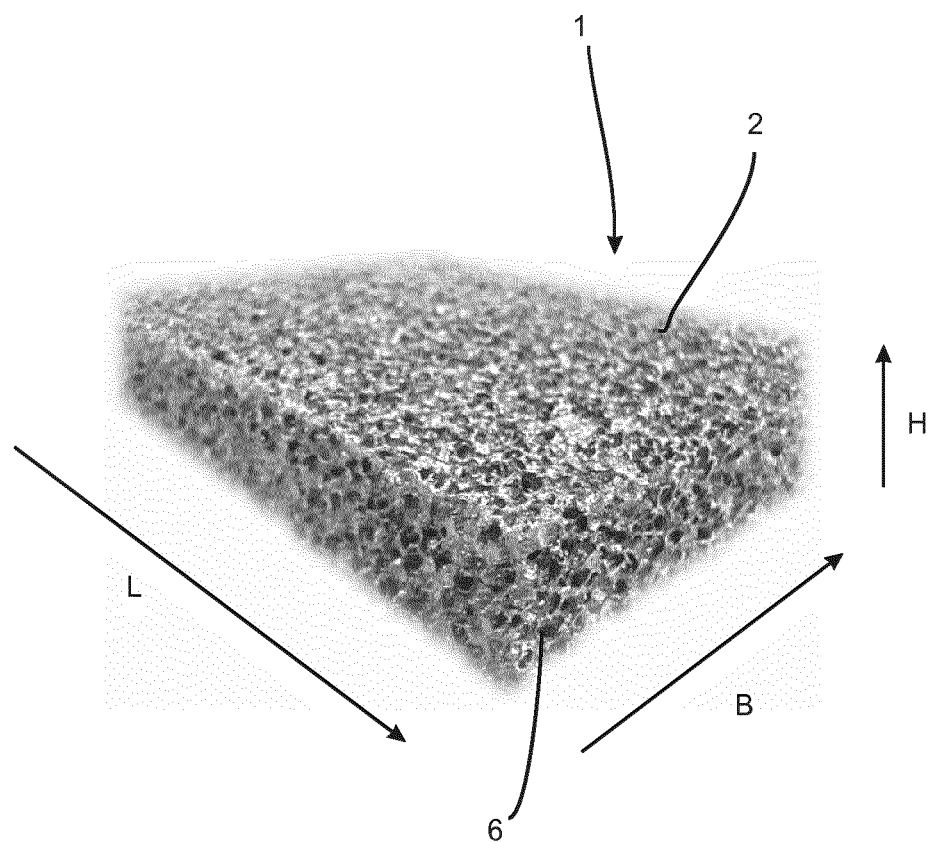

FIREPROOFING STRIP

The present invention relates to a fireproofing device and in particular a fireproofing strip. Such fireproofing strips are known from the prior art. Such fireproofing strips are usually used in order to form joints between masonry components, in particular for ensuring reliable fire resistance. In this case such fireproofing strips must meet specific criteria, for example specific isolation provisions in the fireproofing. Thus for example specific fire resistance durations, for example up to 120 minutes, must be achieved. PUR sealing strips for example which are provided with a special impregnation are known from the prior art.

Therefore the object of the invention is to provide a fireproofing strip which is improved by comparison with the prior art. Thus for example the production of such strips should be simplified.

This object is achieved according to the invention by a fireproofing device and an impregnating composition according to the independent claims. Advantageous embodiments and modifications are the subject of the subordinate claims.

A fireproofing device according to the invention and in particular a fireproofing strip has an elongate support, which is produced from a foam material, a non-woven fabric and/or a fibrous body and is provided with an impregnating agent (and/or a coating). According to the invention this impregnating agent (and/or the coating) contains as a component at least one liquid medium, such as preferably water and a binder for binding components and in particular solid components of the impregnating agent to the foam material as well as expandable graphite. The impregnating agent or the coating preferably also contains a phosphorus-containing compound (or a phosphorus-containing substance).

The support is preferably produced from a foam material. In addition the support can also be made up of a plurality of materials such as for instance a foam material, a non-woven fabric and/or a fibrous material.

In a further preferred embodiment the liquid medium is water or it contains water. In addition, however, the liquid medium may also be a liquid solvent or a mixture of water and a liquid solvent. The solvent may preferably be an organic solvent.

In a preferred embodiment the fibrous material is a body, in particular a planar body such as in particular, but not exclusively, mats and/or plates and/or strips. In this case these bodies can be made from a material which is selected from a group of materials containing mineral fibres, glass fibres, plastic fibres, natural fibres, combinations thereof or the like. If as the material a fleece is used, then this fleece comprises a material thickness, which is sufficiently large so that the fleece comprises a predefined resilience. In this case it is conceivable that these bodies are made completely from these fibre materials, but it would also be conceivable that, in addition to the fibre materials, other substances are also present, such as in particular, but not exclusively, binders, aggregate materials and the like.

In a further preferred embodiment the fibrous material is at least partially resilient. Preferably a Resilience of the material is such that, when given a predefined compression, especially a compression to 50% of the original thickness, it resets at least partially, preferably to at least 60% of the original thickness, preferably to at least 70% of the original thickness, preferably to at least 75% of the original thickness and very preferably to at least 80% of the original thickness. These data refer especially to the not yet impregnated material.

In general the carrier is preferably resilient and/or elastic.

The fireproofing strip is in particular a rolled-up fireproofing strip. In this case this fireproofing strip preferably has a predetermined fire resistance. The carbon proportion of the expandable graphite is advantageously between 80 and 99%. It is known that expandable graphite has the characteristic of expanding when heated. This effect is used here for fireproofing purposes. Furthermore, due to this expansion of the expandable graphite a high pressure is generated, which is in particular advantageous if the material is spatially confined. Furthermore, a carbon-containing insulating substance is produced which shields the foundation structure against the heat source. The composition of the expandable graphite is preferably selected in such a way that its expansion begins at a specific temperature, wherein this temperature is preferably between 90° C. and 240° C., preferably between 120° C. and 200° C. and particularly preferably between 140° C. and 190° C. and particularly preferably between 160° C. and 180° C. In this way a hardly combustible or non-combustible foam material profile can preferably be provided for fireproofing sealing of building openings, such as in particular, but not exclusively, joints, interstices between components or wall openings.

Instead of a rolled-up material, however, this fireproofing strip can also be provided for example as a tubular body which can for example be wrapped around a pipe. The rolled-up material could also have a width which allows the material to be laid around pipes. The fireproofing device described here is suitable and intended in particular for building construction.

In a preferred embodiment the material is a reticulated foam material. In particular a reticulated PU foam material and in particular a reticulated PU soft foam is used. In this way the foam material support also fulfils the function of a filter foam. Due to the reticulation, which may in particular involve an aftertreatment of the foam material, a (greatly) increased liquid, gas or air permeability thereof may in particular be achieved. In particular, such PU soft foams are also very suitable with regard to the conventional grain diameter of the expandable graphite. The reticulation of the foam material is also advantageous in particular when expandable graphite is used.

In general both open-celled and also closed-celled foam materials can be used, although open-celled foam material is preferred. Thus for example flexible silicone foams could also be used. Instead of polyurethane foams it is also possible to use polyvinyl chloride foams, polyolefin foams, polystyrene foams, foams based on copolymers of acrylonitrile, styrene and potentially butadiene and also foams made of thermosetting synthetic resins such as for example: melamine formaldehyde resins or phenol formaldehyde resins. The latter applies in particular to coatings.

In a further advantageous embodiment the foam material support has a cell size which is between 2,000 and 7,000 μm, preferably between 3,000 and 6,000 μm and particularly preferably between 3,400 and 5,600 μm. This cell size has proved particularly suitable in order to accommodate expandable graphite particles. The foam material is preferably an open-celled foam material. In this case these cells are suitable and intended in particular to accommodate particles and in particular expandable graphite particles.

The foam material is preferably produced by a PUR foaming process. In addition, liquid and reactive starting materials can be used. In particular long-chain polyols are used in the production. According to an advantageous embodiment of the invention the foam material is a polyurethane foam, preferably polyurethane soft foam. Such a foam has proved particularly advantageously, since it has particularly advantageous elastic properties with a particularly advantageous resilience, so that reliable sealing of building openings is possible.

The production of the impregnated foam material can take place for example by impregnation of the foam material with insulating layer forming agents which foam or intumesce in the event of fire. The constituents of the fireproofing material (or the dispersion or the impregnating agent) are preferably mixed with one another by means of a stirrer. Next the raw foam, which is obtained as sheets or rolls of material made from a polyurethane block foam, is impregnated, preferably in an impregnation apparatus, with the fireproofing material to a predetermined higher bulk density.

For this purpose the foam material or a foam material support could be immersed for example in a solution or dispersion of the impregnating agent. Additionally or alternatively, during the production it would be possible for the foam material support to be conveyed, for example pulled, through a bath of the impregnating agent. Immersion rollers or squeeze rollers can be used if required. Thus the product is preferably a foam material which is squeezed and preferably also dried in the production process.

Excess impregnating agent can be pressed out of the foam material between rollers until the required degree of impregnation is reached. Next the drying takes place and thus also the firm bonding of the impregnating agent to the foam material. The degree of impregnation can be set by variation of the roller pressure/roller spacing. Thus it is possible to vary the amount of impregnating agent absorbed by the foam material. Subsequently or after compression of the impregnated sheets or rolls of material they are cut to predetermined dimensions for use. Therefore the fireproofing device is configured as a roll or material on a roll.

The bulk density of this foam material support is advantageously greater than 15 kg/m$^3$, preferably greater than 20 g/m$^3$ and particularly preferably greater than 24 kg/m$^3$. The bulk density of the support is advantageously less than 40 kg/m$^3$, preferably less than 35 g/m$^3$, particularly preferably less than 30 kg/m$^3$ and particularly preferably less than 26 kg/m$^3$.

These bulk densities have proved particularly suitable for impregnating with the impregnating agent which contains expandable graphite.

The foam material support is advantageously penetrated at least partially and preferably completely by the impregnating agent. The foam material support is preferably penetrated substantially uniformly by the impregnating agent. At least 60 kg, preferably at least 70 kg, preferably at least 80 kg and particularly preferably at least 90 kg (dry) impregnating agent are preferably introduced into 1 m$^3$ soft foam. At most 200 kg, preferably at most 180 kg, preferably at most 150 kg, preferably at most 120 kg and particularly preferably at most 110 kg (dry) impregnating agent are preferably introduced into 1 m$^3$ soft foam.

The space product of the finished (and uncompressed) product is preferably at more than 70 kg/m$^3$, preferably at more than 80 kg/m$^3$, preferably at more than 90 kg/m$^3$, preferably at more than 100 kg/m$^3$, preferably at more than 110 kg/m$^3$, preferably at more than 115 kg/m$^3$ and preferably at more than 120 kg/m$^3$. The space product of the finished (and uncompressed) product is preferably at less than 160 kg/m$^3$, preferably at less than 140 kg/m$^3$, particularly preferably at less than 130 kg/m$^3$.

In a further preferred embodiment the binder is an acrylate binder. This acrylate binder can preferably have a solids content of more than 30%, of more than 35% and particularly preferably of more than 40% and particularly preferably of more than 45% and particularly preferably of more than 50%.

Furthermore, the acrylate binder preferably has a solids content of less than 80%, preferably of less than 70%, preferably of less than 65% and particularly preferably of less than 60%. The acrylate binder preferably has a solids content of approximately 55%.

In general it would also be possible to use binding agents which contain for instance polyvinyl acetate, polyvinyl acrylate, polyvinyl chloride mixed polymerisates, polychloroprenes and carbonisers, such as for example phenolic resins, melamine resins, polyimides or polyacrylonitrile. In addition, both water-based fireproofing materials and also solvent-based fireproofing materials can be used.

In a further advantageous embodiment the impregnating agent has a phosphate, preferably a polyphosphate and particularly preferably ammonium polyphosphate as a phosphorus-containing compound. In this case can this ammonium polyphosphate can have a pH value between 5 and 8 and preferably between 5.5 and 7.5. Advantageously the viscosity of the ammonium polyphosphate at a temperature of 25° C. and a 10% suspension is less than 200 mPas, preferably less than 150 mPas and particularly preferably less than 100 mPas. Generally other flameproofing agents, for example based on halogen, boron or nitrogen compounds, would also be considered in order to achieve a difficult combustibility or non-combustibility.

However, the use of phosphorus compounds has also proved particularly advantageous in conjunction with the use of expandable graphite, both in processing and also in use. An ammonium polyphosphate suspension between 5% and 20%, preferably between 7% and 18%, preferably between 8% and 12%, has proved particularly suitable (these details relate in each case to percentages by weight). Such an ammonium polyphosphate suspension preferably forms a slurry in water, wherein the specifically light powder is kept suspended very well in water. However, only a proportion of less than 10%, preferably of less than 5%, preferably of less than 3%, preferably of less than 2%, preferably of less than 1% and preferably of less than 0.5% is dissolved.

In a preferred embodiment already a sufficient fireproofing or sufficient flame inhibition can be achieved—in particular by synergistic effects of a phosphorus-containing compound with the expandable graphite—so that layered silicates as additional fire or flame retardants can be omitted. In a further preferred embodiment it is possible to completely omit further fire or flame retardants so that, in addition to the foam material and the adhesive surface, the fireproofing strip consists merely of expandable graphite and the at least one phosphorus-containing compound as well as (optionally) water and/or binder and any included contaminants or other components with a proportion by weight of less than 2%, preferably less than 1%.

Advantageously, as mentioned above, a phosphate, particularly preferably a polyphosphate, particularly preferably an ammonium polyphosphate is used as a phosphorus-containing compound. This ammonium polyphosphate advantageously has a phosphorus content (in % (w/w)) between 25 and 36, preferably between 28 and 35 and particularly preferably between 31 and 33. The proportion of nitrogen (likewise in % (w/w)) is preferably between 10 and 20, preferably between 12 and 18 and particularly preferably between 14 and 15.

The proportion of water in the substance (likewise in % (w/w)) is preferably below 1, particularly preferably below 0.5 and particularly preferably below 0.4 and particularly preferably below 0.3. The solubility in water (based on a 10% solution) is preferably (in % (w/w)) below 1.0, preferably below 0.8, preferably below 0.7 and preferably below 0.6 and particularly preferably below 0.55. These percentage details relate in each case to percentages by weight.

The average particle size of the ammonium polyphosphate (in μm) is between 5 and 25, preferably between 10 and 20 and particularly preferably between 15 and 18.

A particle size of the expandable graphite (measured in Mesh) is preferably greater than 20 Mesh, preferably greater than 30 Mesh, particularly preferably greater than 40 Mesh and particularly preferably greater than 50 Mesh. (This information describes the particle size of material sieved through sieves with corresponding mesh sizes). The above-mentioned details of the mesh size in Mesh in each case represent the mesh size at which at least 80% of the particles remain in the sieve. The standard ASTM E11-87 is taken into consideration. Preferably between 8% and 12% have a size of more than 500μ, and/or between 80% and 90% have a size of more than 200μ (and less than 500μ), and/or between 1% and 4% have a size of more than 100μ (and less than 200μ).

In a further preferred embodiment the binder, together with the expandable graphite and/or the ammonium polyphosphate, forms an intumescent material.

The impregnating agent advantageously has a proportion of water of between 40 and 60 parts (because of the proportion of water in the acrylate) per 100 parts, and/or a proportion of binder of between 25 and 35 parts per 100 parts and/or a proportion of expandable graphite of between 15 and 25 parts per 100 parts. The proportion of binder is preferably present as a solution, suspension or emulsion. The proportion of solids in the binder is preferably between 30% and 80%, preferably between 40% and 70% and particularly preferably between 50% and 60%. Water or an organic solvent or a solvent mixture can be used as a solvent (in the case of a solution), an outer phase (in the case of emulsions) or liquid phase (in the case of suspensions). These details relate in each case to percentages by weight.

The proportion of the phosphorus-containing compound, particularly preferably of the ammonium polyphosphate, is preferably between 1 and 10 parts per 100 parts, preferably between 1 and 5 parts per 100 parts. These details relate in each case to percentages by weight.

In a further preferred embodiment the substance also contains a preservative and particularly preferably approximately 1 part of preservative per 100 parts. These details relate in each case to percentages by weight.

The binding agent, which in a particularly preferred embodiment is an acrylate binder, binds the solid components. In this case it is for example possible that approximately 100 kg dry impregnating agent are introduced into the foam (in particular into approximately 1 m³ or approximately 24 kg of foam).

Furthermore, the present invention relates to an impregnating agent, in particular for impregnating foam materials. In this case the composition of this impregnating agent includes 20 to 60 parts of water, 20 to 40 parts of binder and in particular acrylate binder and 15 to 30 parts of expandable graphite. These details relate in each case to percentages by weight.

The impregnating agent preferably also includes a phosphorus-containing compound and in particular 2 to 10 parts of a phosphorus-containing compound, in particular ammonium polyphosphate. These details relate in each case to percentages by weight.

Such a composition has proved particularly advantageous with regard to the desired properties of, on the one hand, the fire retardant action and, on the other hand, the binding into the foam material.

Advantageously the proportion of the phosphorus-containing compound, in particular ammonium polyphosphate, is between 2 and 5 parts and/or the proportion of binder, in particular acrylate binder, is between 25 and 35 parts. These details relate in each case to percentages by weight.

In particular the fireproofing strip described above, which in particular can be wound up as a roll, has the advantages of high air permeability in the installation situation. Furthermore, in the event of fire the strip provides a very high degree of smoke-tightness. In studies it has been shown surprisingly that, although foam is very large-pored, which in particular is advantageous for the introduction of even larger expandable graphite particles, this foam nevertheless forms a very good closure in the event of fire. Preferably only particles above a certain diameter will provide the necessary expansion pressure.

The strip thus produced preferably also has a low delayed resilience, which in particular also simplifies the introduction.

In a preferred embodiment the thickness of the freely expanded strip is between one and a half times and two and a half times the intended joint width, preferably between 1.8 times and 2.3 times the intended joint width and particularly preferably approximately double the intended joint width. This means that in the installed state a compression of the strip to between 30% of the thickness and 70% of the thickness, preferably between 40% of the thickness and 60% of the thickness and particularly preferably between 45% of the thickness and 55% of the thickness occurs. The fireproofing strip is preferably suitable and intended to be introduced into joints with a width between 5 mm and 80 mm, preferably between 10 mm and 60 mm and particularly preferably between 10 mm and 40 mm.

In a further embodiment the fireproofing device is provided with an adhesive on at least one surface. In particular the fireproofing device is provided with a self-adhesive coating on at least one surface. In particular this is a surface which is formed by a lengthwise direction and a widthwise direction of the fireproofing device. Furthermore a cover film can be arranged on this adhesive coating. In this case this adhesive coating is preferably applied to the entire corresponding surface.

The fireproofing strip described here is for example suitable for forming a joint between masonry components and in particular for ensuring secure fire resistance.

In order to produce the fireproofing strip according to the invention it would be possible for example to impregnate the foam materials or to coat them on all sides.

However it would also be possible to impregnate and/or to coat the foam materials under pressure or in a vacuum or with the aid of a spraying device.

Furthermore the present invention is directed to a method for producing a fireproofing strip. In this case in a method step a support made from a foam material is provided. This foam material is impregnated with an impregnating agent, wherein this impregnating agent contains as components at least water and a binder for binding components and in particular solid components of the impregnating agent to the foam material, expandable graphite as well as a phosphorus-containing compound.

In a preferred method the impregnating agent described here also contains a predetermined proportion of thickener. In this case the impregnating agent (in particular with thickener) can be adjusted in such a way that substantially no settlement can take place during production.

The (in particular aqueous) impregnating agent with the composition given above (preferably with thickener) is preferably adjusted so that no settlement can take place. A foam material is preferably used which has been described in greater detail above, that is to say in particular a reticulated PU soft foam.

Furthermore, a raw foam with a preselected thickness is preferably moved, and in particular pulled, through a container such as in particular a trough filled with impregnating agent. The width of this raw foam is preferably 1 m. The raw foam preferably runs through at least one and preferably two squeezing rollers which lie at least partially and preferably completely below the impregnating agent and which ensure that, after leaving, the length of material is completely saturated with impregnating agent.

In a further advantageous method a desired and in particular calculated wet weight is adjusted by means of a further squeezing device, and in particular by means of a pair of squeezing rollers. In this case this further squeezing device is arranged at least partially and preferably completely above the level of the impregnating agent.

In a further advantageous method the compression takes place with delivery of an adhesive strip and in particular a double-sided adhesive strip. Lastly, cutting of the produced large roll to the required width preferably takes place. In this way particularly simple production is possible.

Further advantages and embodiments are apparent from the appended drawings.

In the drawings:

FIG. 1 shows a representation of a fireproofing strip according to the invention.

FIG. 1 shows a schematic representation of a fireproofing strip 1 according to the invention. In this case this fireproofing strip 1 extends along a lengthwise direction L and is preferably also rolled up in this lengthwise direction L. The reference sign B designates a width of the fireproofing strip. This is preferably between 10 mm and 150 mm, preferably between 20 mm and 100 mm.

The reference H designates the height of the fireproofing strip. As explained above, in this vertical direction the fireproofing strip can be compressed and can be rolled up in this compressed state. The height H of the strip is smaller than the width B, preferably also in an expanded state.

The reference 2 designates the support of the fireproofing device, which in particular is a PU soft foam support. As can be seen in the drawing, this support has a plurality of cells 6 in which expandable graphite (not shown) can be embedded. Furthermore, the support shown in the drawing is penetrated by an impregnating agent (not shown).

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCE SIGNS 1 fireproofing device
2 support
6 cell
L length of the fireproofing device
B width of the fireproofing device
H height of the fireproofing device

The invention claimed is:

1. Fireproofing device, in particular a fireproofing strip with an elongate support, which is produced from a foam material and is provided with an impregnating agent, wherein this impregnating agent contains as components at least one liquid medium and a binder for binding solid components of the impregnating agent to the foam material and expandable graphite, wherein the foam material is squeezed and the strip has a delayed resilience.

2. Fireproofing device according to claim 1, wherein the impregnating agent has a phosphorus-containing compound.

3. Fireproofing device according to claim 1, wherein the foam material is a reticulated foam material.

4. Fireproofing device according to claim 1, wherein the foam material support has a cell size between 2000 μm and 7000 μm.

5. Fireproofing device according to claim 1, wherein the foam material support is penetrated at least partially by the impregnating agent.

6. Fireproofing device according to claim 1, wherein the binder is an acrylate binder.

7. Fireproofing device according to claim 1, wherein the impregnating agent contains as a phosphorus-containing compound a phosphate.

8. Fireproofing device according to claim 1, wherein the binder together with the expandable graphite and/or with ammonium polyphosphate forms an intumescent material.

9. Fireproofing device according to claim 1, wherein the impregnating agent has a proportion of water of between 40 and 60 parts per hundred parts, and/or a proportion of binder of between 25 and 35 parts and/or a proportion of expandable graphite of between 15 and 25 parts.

10. Fireproofing device according to claim 1, wherein the liquid medium is water or contains water and/or the liquid medium contains solvent.

11. Fireproofing device according to claim 1, wherein the foam material is a reticulated PU soft foam.

12. Fireproofing device according to claim 1, wherein the foam material support has a cell size between 3000 μm and 6000 μm.

13. Fireproofing device according to claim 1, wherein the foam material support has a cell size between 3400 μm and 5600 μm.

14. Fireproofing device according to claim 1, wherein the foam material support is penetrated completely by the impregnating agent.

15. Fireproofing device according to claim 1, wherein the impregnating agent contains as a phosphorus-containing compound a polyphosphate.

16. Fireproofing device according to claim 1, wherein the impregnating agent contains as a phosphorus-containing compound an ammonium polyphosphate.

17. Fireproofing device according to claim 1, wherein the liquid medium contains an organic solvent.

18. Method of producing a fireproofing strip providing a delayed resistance, comprising the steps of:
    providing a support made of a compressible foam material;

impregnating this foam material with an impregnating agent, wherein this impregnating agent contains as components at least water and a binder for binding components of the impregnating agent to the foam material, expandable graphite as well as a phosphorus-containing compound; and squeezing and drying the impregnated foam material and thus firm bonding of components of the impregnating agent to the foam material.

* * * * *